UNITED STATES PATENT OFFICE.

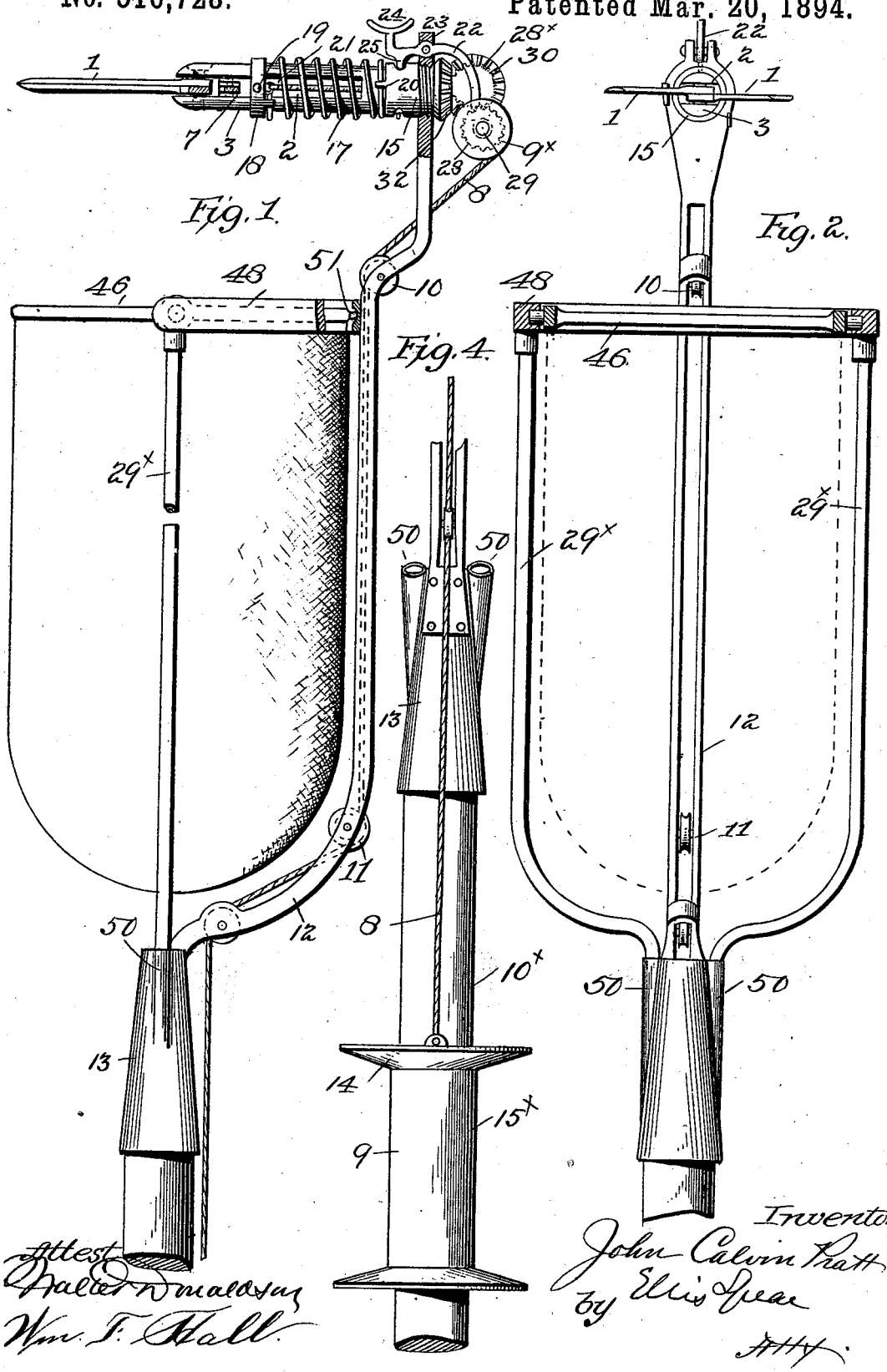

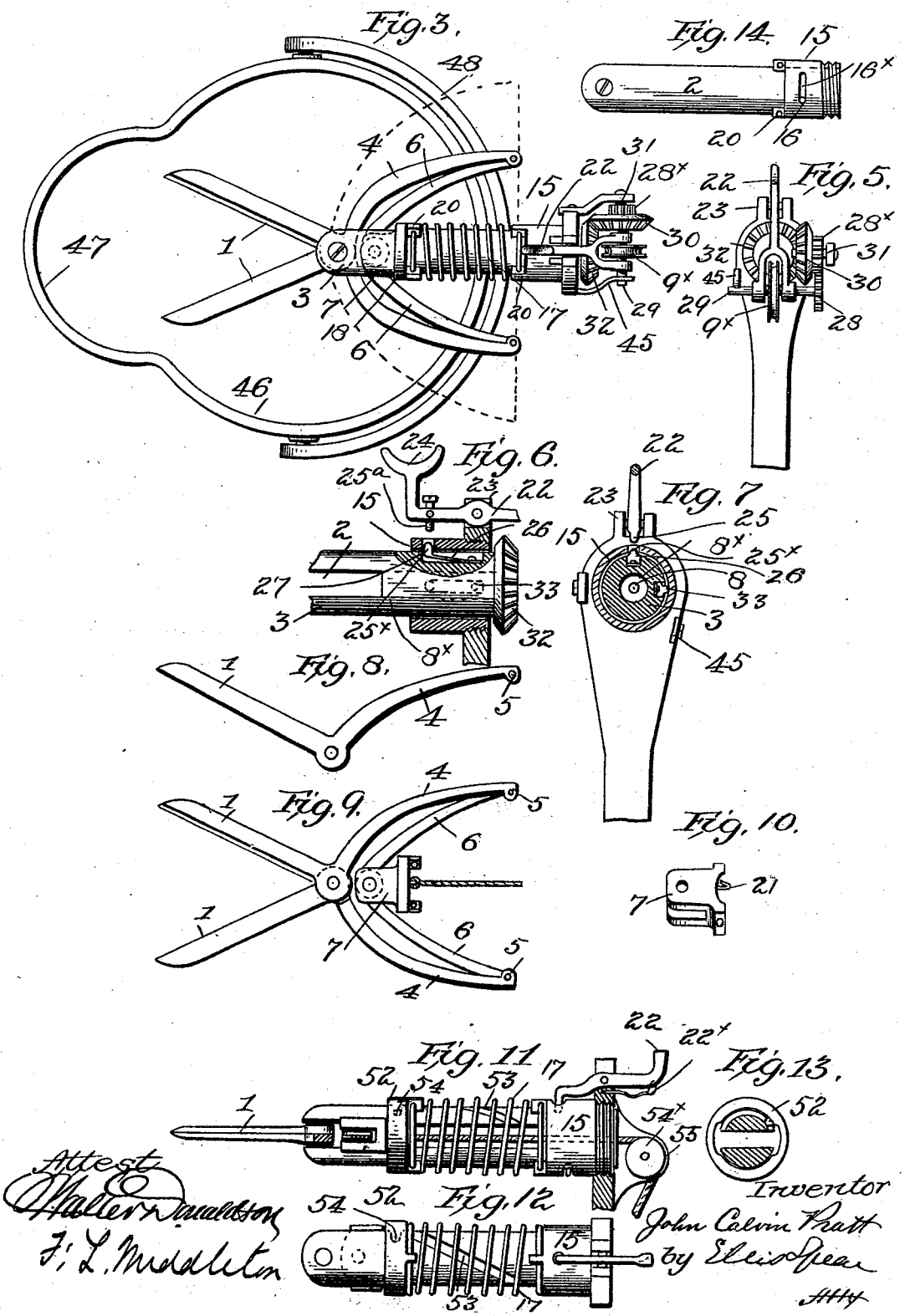

JOHN CALVIN PRATT, OF MIDDLETOWN, CONNECTICUT, ASSIGNOR OF ONE-HALF TO JOHN MORGAN, OF SPRINGFIELD, MASSACHUSETTS.

FRUIT-PICKER.

SPECIFICATION forming part of Letters Patent No. 516,728, dated March 20, 1894.

Application filed June 14, 1893. Serial No. 477,523. (No model.)

*To all whom it may concern:*

Be it known that I, JOHN CALVIN PRATT, a citizen of the United States of America, residing at Middletown, in the county of Middlesex and State of Connecticut, have invented certain new and useful Improvements in Fruit-Pickers, of which the following is a specification.

It is my object to provide a fruit picking device which will facilitate the gathering of the fruit and enable the person using it to adjust the cutters or picker blades to different angles to suit all the different positions in which the fruit may be in various parts of the tree.

It is my object further to render the device as simple as possible and to utilize the same connection or cord which operates the cutters to adjust the cutters to different angles in relation to the pole or support so that no matter in which direction the stem of the fruit may project from the limb the operator by drawing on the one cord may first adjust the cutters to the proper inclination and then by a second pull upon the cord the cutter blades may be forced together to pick the fruit.

My invention consists broadly of the cutters or nippers carried on a swiveled bar or support which in turn is arranged to be turned or swiveled in a bracket at the upper end of the pole the said bar being turned by means of the same cord which is used to operate the cutters.

My invention includes other features hereinafter described.

In the drawings:—Figure 1, is a side view; Fig. 2, a front view, and Fig. 3, a plan view of the device. Fig. 4, is a rear view of the upper part of the pole with the pole socket and hand piece in place. Fig. 5, is an end view of the left hand portion of Fig. 3. Figs. 6 and 7 are detail views of the swivel connection of the cutter supporting bar. Figs. 8 and 9 are detail views of the cutter blades and operating means therefor. Fig. 10, is a detail view. Fig. 11 is a side elevation partly in section of a modification. Fig. 12, is a plan view of the same. Fig. 13, is a transverse section along the line of the groove in the swiveled bar. Fig. 14, is a view of a detail.

The cutter blades 1 are pivoted together in the forward end of the slot 2 of the bar or cutter support 3 and each blade is formed with an extension 4, which diverge from each other and are pivoted at 5 at their rear ends to the curved links 6 which converge toward the front and are pivoted in the split or slotted block 7 arranged to slide in the slot of the bar 3. This block lies normally close to the pivot of the cutter blades which are then open but when the cord 8 leading to the sliding hand piece 9 on the pole $10^\times$ is pulled upon by sliding the hand piece down, the block 7 will slide rearward in the slot of the bar and through the links 6 spread apart the rear extensions of the cutter blades to cut or pick the fruit.

The operating cord extends through the slot of the bolt and rear opening $8^\times$ which forms a continuation of the slot, thence over the pulley $9^\times$ from which it passes around the pulleys 10 and 11 which are journaled between the side pieces of the back bar 12 extending up from the socket 13 on the upper end of the pole. From the pulley 11 the cord extends down alongside the pole to the sliding hand piece on the pole which has flanges 14 connected by a cylindrical portion $15^\times$. The back bar curves rearwardly from the socket 13 to which it is attached as in Fig. 4, and then it extends straight up to the pulley 10, where it is bent again, the upper straight end having a screw threaded opening in which the sleeve 15 is screwed and this sleeve forms the socket or bearing in which the cutter support or bar is carried and adapted to swivel. The swiveled bar is retained in the sleeve 15 by the pin 16 on the bar projecting into the slot $16^\times$ in the sleeve Fig. 14. Around the bar there is a spiral spring 17 fixed at one end to the sleeve which is immovable and at the other end to a ring 18 surrounding the bar and to which the sliding block 7 is connected by the screw 19. The ends of the spring pass through ears 20 on the sleeve and ring respectively which holds the spring securely in place. When the cord is pulled to close the cutter blades the spring is compressed between the ring and the sleeve and thus serves to return the parts to normal position and open the cutters when the pull on the cord ceases. The cord is connected to the sliding block by a hook or eye 21 on the block.

For turning the cutter supporting bar in the sleeve in order to present the cutters at different angles to suit the various positions in which the fruit may lie I provide a lever 22 pivoted above the sleeve and swiveled bar in the ears 23 of the rear bar or standard. This lever has a forked extension 24 which may be pressed against any limb of the tree adjacent to the apple or other fruit to be picked and thus the lever will be turned to cause the stud 25 thereon to engage and press down the stud $25^\times$ of the spring 26 arranged in the socket 27 in the bar 3 Figs. 6 and 7. This spring normally holds the bar against swiveling by its engaging an opening in the sleeve but when the stud $25^\times$ is thus forced down out of said opening the bar with the cutters or pickers is free to turn. When the lever 22, is rocked on its pivot by pressure against a limb the pinion 28 on the shaft 29 of the pulley $9^\times$ is raised to engage a similar pinion $28^\times$ on the beveled gear 30 the shaft 31 of which is journaled in a bracket projecting from the back bar or standard. This beveled gear operates the gear 32 on the end of the swiveled bar and thus when the pinions 28 and $28^\times$ are in mesh, the pull on the cord will turn the pulley $9^\times$ with its shaft and the gearing will then operate to turn the swiveled bar of the cutters around to present said cutters at an angle.

As the shaft 29 of the pulley 9, is carried by the lever 22 the movement of the lever will not only release the spring which holds the swiveled bar but also throw the gearing into operation to turn the bar, and the bar may then be turned until a second spring 33, Figs. 6 and 7, engages the opening in the sleeve when the bar will be held against further rotation and then the pressure of the forked lever 22 against the tree limb may be entirely relaxed. The pinions will then disengage and the rope may be pulled to draw back the slide and thus close the cutters. The spring surrounding the swiveled bar serves to return the same to normal position when the lever 22 is pressed again to release the second holding spring 33. An arm 45 projects from the standard to overlie the shaft 29 and act as a stop or bearing for the shaft when it rises, and prevents twisting or strain on the shaft. The lever 22 may have an adjustable screw or stud $25^a$ as shown in Fig. 6 to engage the spring stud $25^\times$.

As shown in Fig. 3, in dotted lines I may protect the cutter extensions and the links 6 by means of a suitable guard or shield extending over the central part of the device or as much as is found desirable in order to prevent entanglement with twigs, leaves or branches. This shield may be made of wire netting which is secured to the rotary bar so that while the bar is turned the wire shield will move with it and thus serve to protect the parts in all positions. I may use any other form of shield if desired.

It will be understood that the pinions 28 and $28^\times$ while shown as on the outer side of the bevel gear may be located on the inner side if desired.

The bag for catching the fruit is secured to a ring 46 which may be circular or it may have an extending portion 47 as in Fig. 3, to project beyond the end of the cutters. The ring is pivoted in the semi-circular arms 48 projecting forward from the rear bar and supported at their forward ends adjacent to the pivot points by means of small rods or pipes 29 extending up and spreading from the pockets 50 on each side of the handle socket. A stud 51 on the ring may be arranged to snap into a socket in the frame thus tending to hold the ring and bag in proper position.

The pole may be formed extensible in any suitable manner as by making it in sections.

Figs. 11 and 12, show a modification of the device in which the gearing is entirely dispensed with. The arrangement of the swiveled bar, the lever for operating the same and the sliding block is substantially the same as in the first form with the following exceptions. In this form however, the two catches 26—33 are omitted and the lever 22 is all that is required, it having a stud adapted to fit into holes formed in the surface of the bar; another difference is that the ring 52 instead of being rigidly connected to the sliding block 7 is merely in contact with it and is thus free to turn about the bar as will be hereinafter described. The block itself is a little different as it has small lips or flanges bearing on the edges of the bar so that the block will be guided and held in place. The sliding block when pulled by the cord pushes the ring 52 to the rear. This ring is connected with the rigid sleeve by means of the spiral spring as in the former case. The ring carries a pin 54 engaging an inclined slot 53 formed in the surface of the bar and when the ring is pushed to the rear the bar will be turned by the pin traveling in the inclined slot provided the lever 22 has already been operated to release the bar so that it is free to turn. This action is due to the fact that the spring while free to be compressed is strong enough to hold the ring in its normal relation to the sleeve, that is, it will not turn circumferentially in relation to the sleeve, and as the ring does not turn the bar must be rotated when the ring is moved along it. The lever 22, is pressed normally by spring $22^\times$. The rope or cord passes over the pulley 54 which is journaled in the brackets 55, projecting from the standard.

It will be understood that the above action takes place only when the bar is released by the lever $22^\times$ and it is desired to turn the cutters at an angle. When the bar is held rigid by the lever the pull on the rope will draw the ring back and close the cutters, the ring turning or twisting with the spring at this time without effect by reason of the pin traveling in the slot.

By having the bag pivotally supported as described the same will be kept upright no matter whether the pole be held vertical or inclined.

The pipes 29$^\times$ of the frame combine lightness and strength.

I claim—

1. In a fruit picker the cutters or pickers, the swiveled support therefor extending at right angles to the pole to turn in a horizontal plane, the pole carrying the swiveled support and the means for operating the pickers and the swiveled support, substantially as described.

2. In combination, the cutters or pickers, the swiveled support therefor consisting of the bar, the sliding block connected with the cutters and guided by the swiveled bar, the cord connected with the slide the catch with means for operating the same and the means for operating the swiveled bar through the action of the said cord, substantially as described.

3. In combination, the cutters, the swiveled bar for supporting the same, the catch for holding the swiveled support, the means adapted to be pressed against a limb for releasing said catch and the means for operating the cutters and the swiveled support therefor, substantially as described.

4. In combination, the cutters, the slotted bar, the swiveled connection therefor with the pole standard, the sliding block in said slot, the connections from the block to the cutters the ring around the block, the spring interposed between the ring and the swiveled connection the cord for operating the slide extending through the bar to the operator and the means for turning the swiveled bar, substantially as described.

5. In combination in a fruit picker the supporting pole, the cutters and the support therefor to which they are pivoted extending substantially at a right angle to the pole, said cutters having rear extensions, the links connected thereto and extending forward toward the pivot of the cutters the sliding block moving in the support of the cutters and connected to the forward ends of the links the cord connected to the sliding block and the spring for returning the parts to normal position, substantially as described.

6. In combination, the fruit picker device, the pole, the socket thereon, the back bar extending from said socket and supporting the fruit picker, the pulleys on said back bar the cord extending over the same to the operator's hand, the pockets on each side of the pole socket, the supports extending from said pockets, the arms connected with the upper ends of said supports and the bag pivoted in said arms, substantially as described.

7. In combination, the cutters or pickers, the swiveled bar carrying the same, and having an inclined slot, the ring having a pin engaging said slot, the cord for operating the said cutters and moving the ring along the bar and the spring for returning the ring to normal position, substantially as described.

8. In combination, the fruit pickers or cutters, the swiveled support therefor comprising the revoluble bar having a slot in its surface and the means for turning the bar consisting of the ring having a pin entering the slot, the cord for operating the ring and the spring for returning the ring to normal position.

In testimony whereof I affix my signature in presence of two witnesses.

JOHN CALVIN PRATT.

Witnesses:
 HENRY E. COOPER,
 JAMES M. SPEAR.